May 16, 1950  M. A. J. L. GAULT  2,507,779
GLASS CUTTING DEVICE

Filed Jan. 7, 1947  4 Sheets-Sheet 1

Inventor
M. A. J. L. Gault
By
Attys.

May 16, 1950 — M. A. J. L. GAULT — 2,507,779
GLASS CUTTING DEVICE
Filed Jan. 7, 1947 — 4 Sheets-Sheet 3

Inventor
M. A. J. L. Gault

May 16, 1950     M. A. J. L. GAULT     2,507,779
GLASS CUTTING DEVICE
Filed Jan. 7, 1947     4 Sheets-Sheet 4
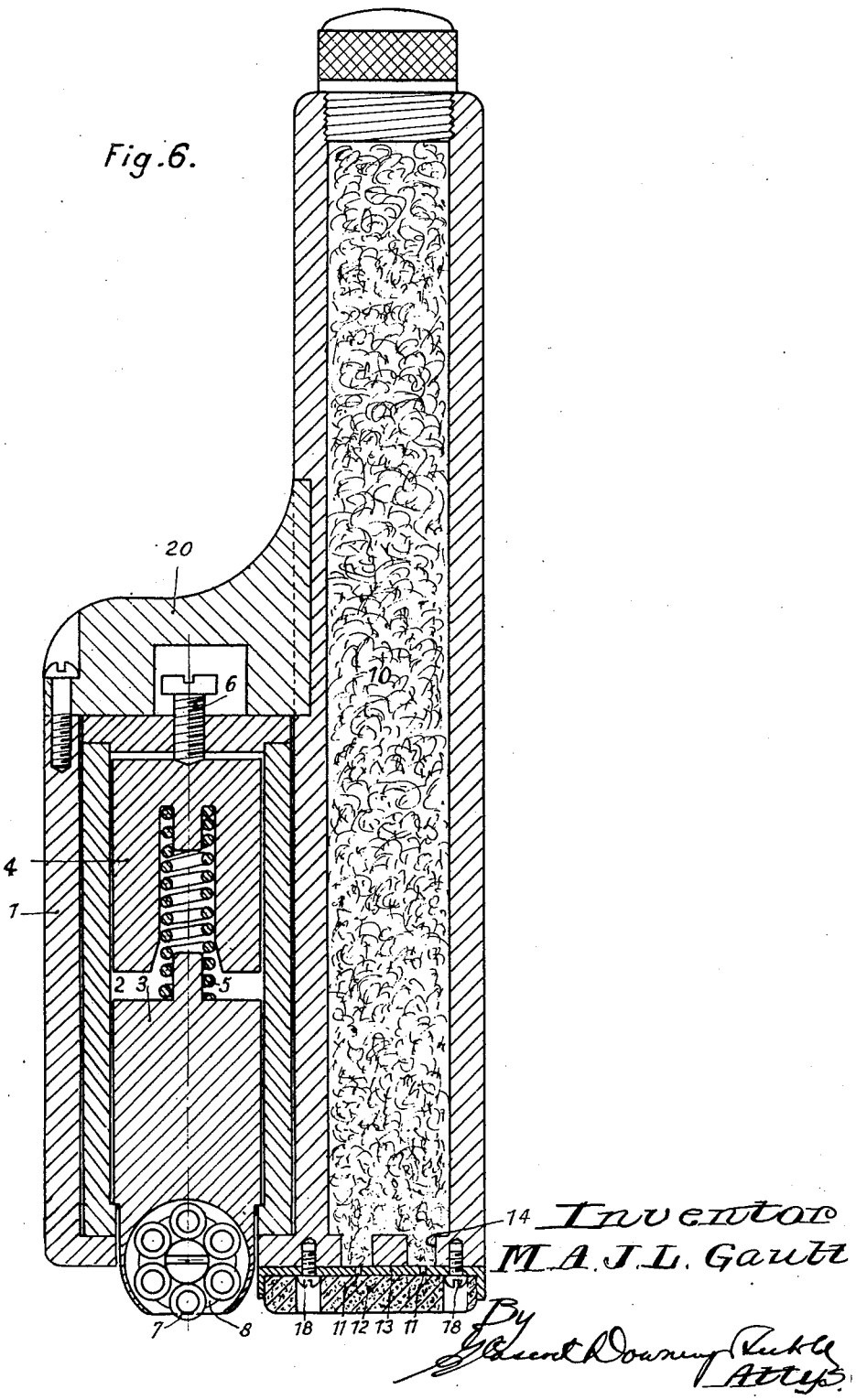

Patented May 16, 1950

2,507,779

UNITED STATES PATENT OFFICE 2,507,779

GLASS CUTTING DEVICE

Marcel Adolphe Joseph Louis Gault, Pithiviers, France, assignor of one-half to Leon Joseph Villiers, Pithiviers, France Application January 7, 1947, Serial No. 720,512
In France January 7, 1946

4 Claims. (Cl. 49—52)

It is well known that glass-cutting by means of cutting-wheel or diamond is a process that provides much disappointment to laymen, who usually have a tendency to put too much pressure on the glass and when they attempt cutting with a diamond, are unskilled in regard to the proper way of using the tool.

Our invention has for its object a glass-cutter that, even when entrusted to unskilled hands, allows the easy achievement of a proper cut.

The glass-cutter forming the object of the invention is distinguished by the fact that it is fixed up in such a way that the cutting tool, that may be either a cutting wheel or a diamond, depending on which is preferred, may be applied to the glass to be cut with a steady pressure adjustable at will, independently of the force exerted by the hand and it includes on the same frame as the cutting tool a kerosene tank of which the content is fed continuously on the surface of the glass close to the operational area of the cutting tool.

Moreover, a set of guide lines may be fixed on the frame on one side or the other of the tool holder to suit the convenience of the operator, thus allowing a speedy delivery of cut glass in the gauges included between standard widths.

The glass-cutter made according to the invention is suited therefore to give the greatest satisfaction not only to the layman but again to the expert, for the employment by which the invention offers besides a simplified form of execution.

The glass cutter is illustrated as an example in the accompanying drawings wherein:

Fig. 6 is a diagrammatic section of a modification of the device illustrated in Figs. 1 to 5.

Figure 1:
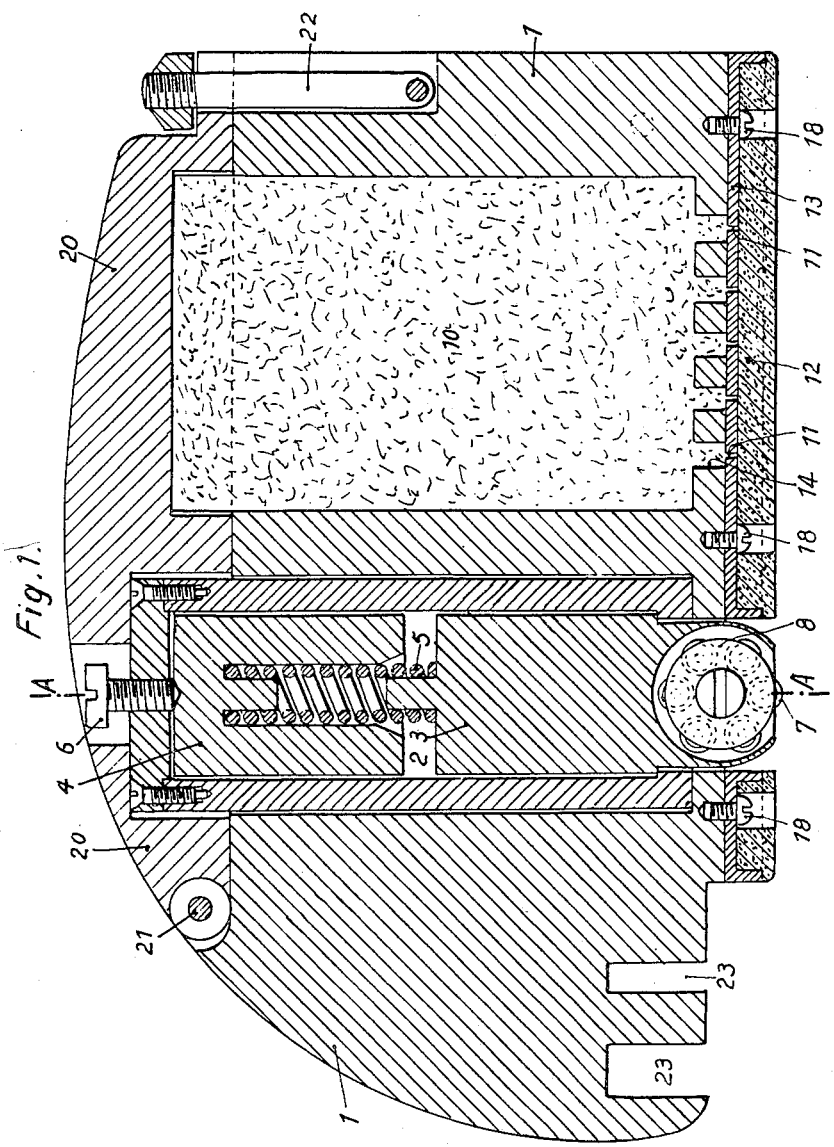
Figure 1 is a section of the apparatus cut along the line B—B of Figure 3.
Figure 2:
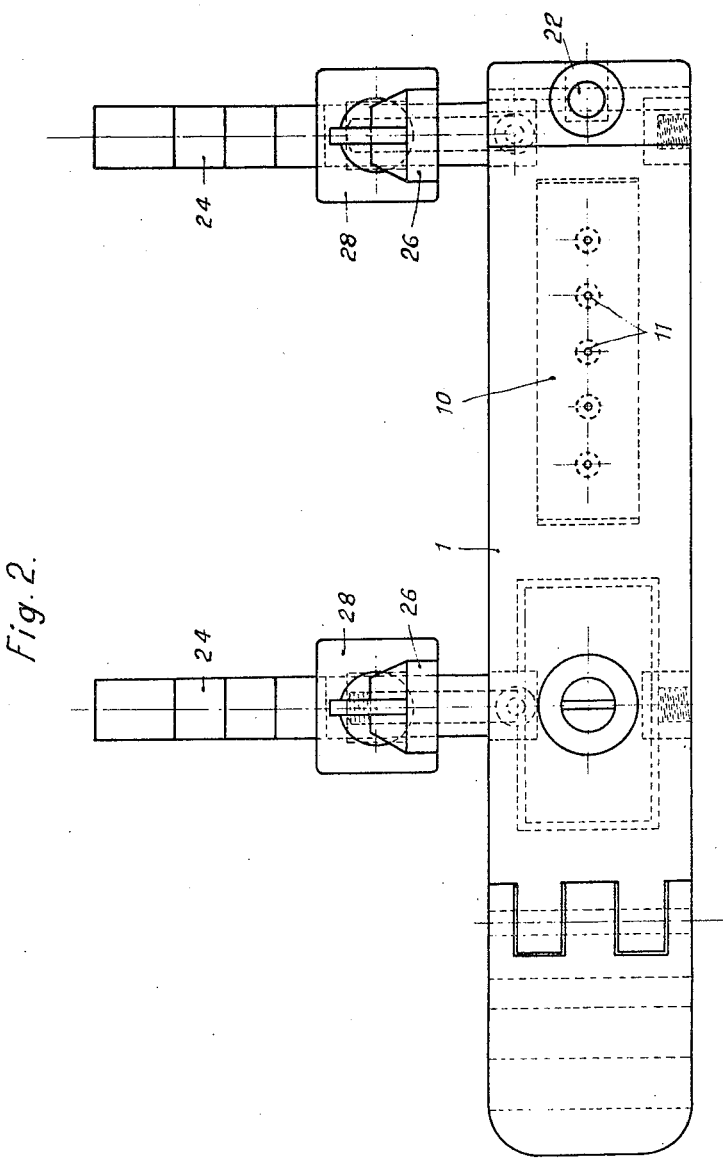
Figure 2 is a plan view.
Figure 3:
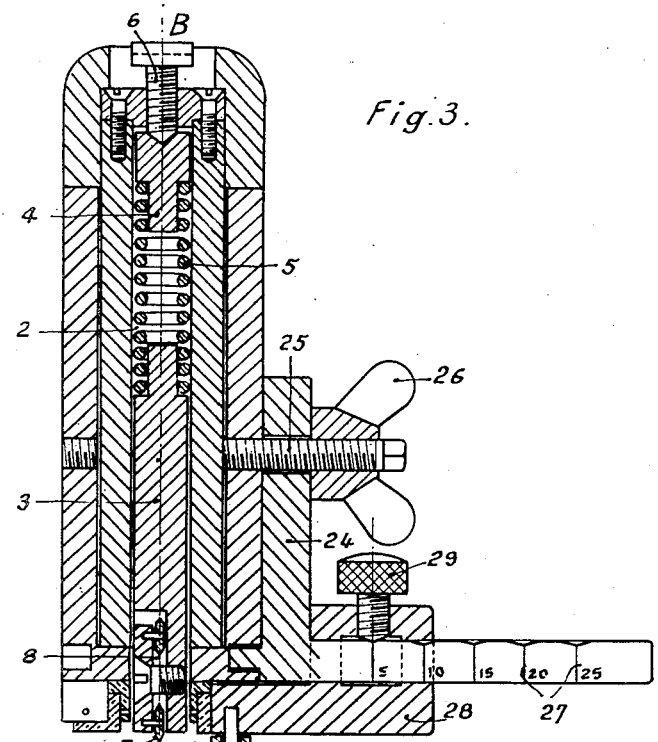
Fig. 3 is a sectional view along the line A—A of Fig. 1.

The glass cutter (Figs. 1 to 5) is formed by a frame 1 in the interior of which a housing 2 is provided to take the tool holder 3 as well as the sliding member 4 arranged above the tool holder and divided from it by spring 5 of which the compression may be adjusted at will by the working of the screw 6; in practice the adjustment of the spring 5 should be so regulated that, when the screw 6 is at the middle of its travel, the force applied on the tool holder may be 4 kilos in the case of a cutting-wheel holder and 1 kilo in the case of a diamond.

In the method of execution illustrated in Figs. 1 to 4 the cutting tool is formed by a cutting wheel 7; a set of cutting wheels 7 may be arranged satisfactorily on a common ring 8, that can be fastened in various positions depending on which of these cutting-wheels is put into service.

Figure 5:
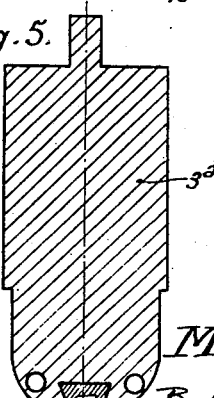

The tool holder 3 besides is interchangeable and Fig. 5 shows a tool holder 3a, furnished with a diamond 9 that can be interchanged with the tool holder 3.

The frame 1 comprises on the other hand a housing for a kerosene or the like tank 10, filled with cotton and opening at its lower end through a set of openings 14 by means of which a strip of felt 12 can be kept saturated with kerosene; the felt during the cutting operation may slide in contacting relationship with the glass surface and thus coats this surface with a thin film of kerosene and this ensures an unrivalled degree of smoothness in the cutting operation and saves the cutting-wheel or diamond from undue wear and tear.

Figure 4:
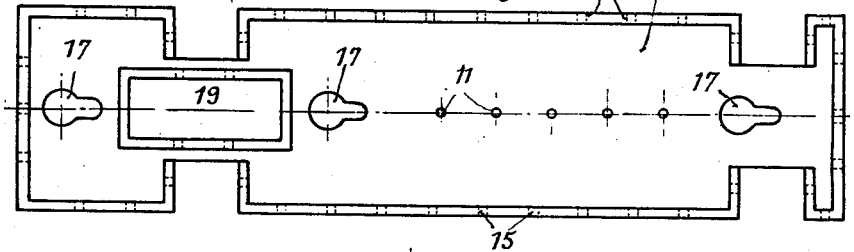
Figs. 4 and 5 are detailed views of various component members of the apparatus.

Fig. 4 shows the holder for the felt formed by plate 13 perforated with holes 11 to allow the kerosene to pass, with side holes 15 through which the thread used for fastening the felt can pass, with holes 17 for screws 18 by means of which the plate 13 is fitted to the frame of the apparatus and finally with a large opening 19 forming a passage for the tool holder.

The frame 1 is furnished with a cover 20 secured by a hinge at 21 and kept in position by screw 22.

The notches 23, cut in the lower part of the frame act in the standard way as crumbling-irons for breaking off the cut glass after the tool has made a groove.

The apparatus comprises finally a means of lining up that allows a speedy production in making longitudinal cuts, by making unnecessary the use of a rule that is hard to keep in position when it comes to cuts of great length.

The lining up is effected in accordance with the invention by means of two guide lines 24 that are fitted to the frame 1, optionally on one side or the other of the frame to suit the convenience of the operator, by means of the screw 25 locked by the nut 26. The horizontal arm of each guide-line 24 is notched at regular distances, for instance at equal divisions every 5 mm., as marked out on a scale 27 and a traveller 28 can move along this arm and may be clamped by means of a screw 29 opposite the particular scale mark selected; the traveller 28 carries on its bottom side a bearing roller 30, of which the distance $d$ to the vertical plane going through the cutting-line of the tool is thus always equal to that shown by the division number on the scale opposite which the screw has been clamped.

The method of execution described above and illustrated in Figures 1 to 5 of the accompanying drawings is intended more especially for use with glass dealers, retailers and private persons; as shown more particularly in Figure 2 it includes two guide lines 24.

Figure 6 illustrates in a more diagrammatic way a simpler form of execution intended for the use of tradesmen such as professional glass-cutters, house painters and glaziers.

In view of the fact that the apparatus is intended, in this form of execution, for employment by skilled glass-cutters, it includes only one guide-line 24, that allows, as the drawing shows, a shorter length of guide line, while the capacity of the kerosene tank is kept up to the desired value by increasing the height of the tank. The parts of the apparatus denoted by the same reference numbers are the same as those shown in the form of execution illustrated in Figures 1 to 5.

In practice, the apparatus will be made of rust-proof parts with the sliding members of softer metal than the enclosing frame.

Having now particularly described and ascertained the nature of my invention and in what manner the same is to be executed, I declare that what I claim is:

1. A glass cutting device comprising a portable frame, a removable flexible glass cutter housed in said frame and composed of a sheath inside which a tool carrier provided with a cutting wheel at its lower part and a sliding member at its upper part are slidably mounted, a spring interposed between the tool carrier and the sliding member, an adjustable screw secured to the upper part of the sheath by means of which the pressure of the spring may be adjusted as desired, a tank lined with cotton provided inside said frame, said cotton being impregnated with a lubricating liquid, a plane felted base having a large surface area lying in the same horizontal plane as the bottom of the cutter and extending under the entire bottom of the tank and under the tool carrier, whereby the frame is adapted to bear on the surface of the glass to be cut and to maintain the glass-cutter in a substantially vertical position in any plane and a plurality of ports provided at the bottom of the tank allowing the lubricating liquid to flow continuously from said tank through said ports over the felted base.

2. A glass cutting device comprising a portable frame, a removable flexible glass cutter housed in said frame and composed of a sheath inside which a tool carrier provided with a diamond at its lower part and a sliding member at its upper part are slidably mounted, a spring interposed between the tool carrier and the sliding member, an adjustable screw secured to the upper part of the sheath by means of which the pressure of the spring may be adjusted as desired, a tank lined with cotton provided inside said frame, said cotton being impregnated with a lubricating liquid, a plane felted base lying in the same horizontal plane as the bottom of the cutter and having a large surface area and extending under the entire bottom of the tank and under the tool carrier whereby the frame is adapted to bear on the surface of the glass to be cut and to maintain the glass-cutter in a substantially vertical position in any plane and a plurality of ports provided at the bottom of the tank allowing the lubricating liquid to flow continuously from said tank through said ports over the felted base.

3. A glass cutting device comprising a portable frame, a removable flexible glass-cutter housed in said frame and composed of a sheath inside which a tool carrier provided with a steel cutting wheel at its lower part and a sliding member at its upper part are slidably mounted, a spring interposed between the tool carrier and the sliding member, an adjustable screw secured to the upper part of the sheath by means of which the pressure of the spring may be adjusted as desired, a tank lined with cotton provided inside said frame, said cotton being impregnated with a lubricating liquid, a plane felted base lying in the same horizontal plane as the bottom of the cutter and having a large surface area and extending under the entire bottom of the tank and under the tool carrier whereby the frame is adapted to bear on the surface of the glass to be cut and to maintain the glass cutter in a substantially vertical position in any plane and a plurality of ports provided at the bottom of the tank allowing the lubricating liquid to flow continuously from said tank through said ports over the felted base, at least one frame guiding member, means for securing it optionally to either side of the frame, a slider slidably mounted on said guiding member provided with a series of notches at equal distances marked out along a scale, a guiding abutment protruding on the lower part of said slider and clamping means for securing the slider on the frame guiding member so as to allow the distance between the guiding abutment and the working plane of the cutting tool to be adjusted by sliding the slider step by step perpendicularly to the cutting line.

4. A glass cutting device comprising a portable frame, a removable flexible glass-cutter housed in said frame and composed of a sheath inside which a tool carrier provided with a diamond at its lower part and a sliding member at its upper part are slidably mounted, a spring interposed between the tool carrier and the sliding member, an adjustable screw secured to the upper part of the sheath by means of which the pressure of the spring may be adjusted as desired, a tank lined with cotton provided inside said frame, said cotton being impregnated with a lubricating liquid, a plane felted base lying in the same horizontal plane as the bottom of the cutter and having a large surface area and extending under the entire bottom of the tank and under the tool carrier whereby the frame is adapted to bear on the surface of the glass to be cut and to maintain the glass cutter in a substantially vertical position in any plane and a plurality of ports provided at the bottom of the tank allowing the lubricating liquid to flow continuously from said tank through said ports over the felted base, at least one frame guiding member, means for securing it optionally to either side of the frame, a slider slidably mounted on said guiding member provided with a series of notches at equal distances marked out along a scale, a guiding abutment protruding on the lower part of said slider and clamping means for securing the slider on the frame guiding member so as to allow the distance between the guiding abutment and the working plane of the cutting tool to be adjusted by sliding the slider step by step perpendicularly to the cutting line.

MARCEL ADOLPHE JOSEPH LOUIS GAULT.

REFERENCES CITED

The following references are of record in the file of this patent:

UNITED STATES PATENTS

| Number | Name | Date |
| --- | --- | --- |
| 308,709 | Sinsz | Dec. 2, 1884 |
| 557,200 | Godell | Mar. 31, 1896 |
| 1,606,802 | Kurtz et al. | Nov. 16, 1926 |
| 1,750,913 | Vollm | Mar. 18, 1930 |

FOREIGN PATENTS

| Number | Country | Date |
| --- | --- | --- |
| 79,682 | Sweden | Dec. 23, 1932 |